United States Patent [19]

Harada

[11] Patent Number: 4,685,877
[45] Date of Patent: Aug. 11, 1987

[54] FOOD EXTRUDING APPARATUS

[75] Inventor: Masaru Harada, Kanagawa, Japan

[73] Assignee: Kabushiki Kaisha Kibun, Tokyo, Japan

[21] Appl. No.: 872,497

[22] Filed: Jun. 10, 1986

[30] Foreign Application Priority Data

Jun. 10, 1985 [JP] Japan .................................. 60-125463

[51] Int. Cl.⁴ ........................ A23P 1/12; B29C 47/12
[52] U.S. Cl. ..................................... 425/190; 99/461;
264/163; 425/310; 425/466; 425/467; 426/516;
426/518
[58] Field of Search ............... 425/190, 191, 295, 300,
425/296, 309, 465–467, 469, 310, DIG. 243;
426/503, 512, 516–518; 99/460, 461, 465, 537;
264/163, 177.16

[56] References Cited

U.S. PATENT DOCUMENTS

| | | | |
|---|---|---|---|
| 2,377,668 | 6/1945 | Bole et al. | 425/164 |
| 2,826,782 | 3/1958 | Dugall et al. | 425/190 |
| 2,999,469 | 9/1961 | Cottingham et al. | 425/190 |
| 3,001,485 | 9/1961 | Czik | 425/190 X |
| 3,008,235 | 11/1961 | Royer et al. | 426/512 X |
| 4,126,704 | 11/1978 | McCarthy et al. | 426/512 X |
| 4,259,051 | 3/1981 | Shatila | 426/503 X |
| 4,260,640 | 4/1981 | Hartmann et al. | 426/516 |
| 4,272,556 | 6/1981 | Shatila et al. | 426/516 X |
| 4,360,332 | 11/1982 | Cyin | 425/191 |
| 4,422,838 | 12/1983 | Iwawaki et al. | 425/466 X |
| 4,422,839 | 12/1983 | Przytulla et al. | 425/465 |
| 4,560,567 | 12/1985 | Rausing | 426/513 X |
| 4,561,626 | 12/1985 | Black | 425/190 X |
| 4,579,745 | 4/1986 | Sue | 426/503 X |
| 4,592,916 | 6/1986 | Akesson | 426/517 |

FOREIGN PATENT DOCUMENTS

| | | | |
|---|---|---|---|
| 145954 | 12/1978 | Japan | 426/512 |
| 893535 | 12/1981 | U.S.S.R. | 425/190 |

Primary Examiner—Richard L. Chiesa
Attorney, Agent, or Firm—Wenderoth, Lind & Ponack

[57] ABSTRACT

A food extruding apparatus including a food receiving member having a through-hole receiving a food or a food material which is to be extruded and an extruding means inserted into the through-hole from one end thereof and moved toward the other end, thereby extruding the food or food material from the through-hole, the extruding means being constituted by outer and inner extruding members. After an extruding operation, these extruding members are not pulled back simultaneously, but the outer extruding member is first pulled back slowly, and then the inner extruding member is raised. There is therefore no fear of any vacuum being produced between the upper surface of a food or a food material and the extruding member when pulled back. Accordingly, it is possible to carry out a food extruding operation smoothly and properly.

5 Claims, 4 Drawing Figures

FOOD EXTRUDING APPARATUS

BACKGROUND OF THE INVENTION

The present invention relates to a food extruding apparatus for extruding soft foods or food materials to form food products having a fibrous texture.

More practically, the present invention pertains to a food extruding apparatus for use in the production of foods having a fibrous texture which is similar to that of the eyes of scallops or the leg meat of crabs.

The following is one example of the conventionally known processes for manufacturing products having a fibrous texture such as that described above. Namely, raw minced fish meat is kneaded under stirring, molded or shaped, allowed to gel and heated to form a fish cake which is usually employed as a final product. Thereafter, this fish cake is finely cut in the shape of fibers, and this finely cut fish cake is texturized using a binding agent or the like and then molded into a desired shape again, thereby providing a fish paste product having a fibrous texture. Alternatively, the finely cut fish cake is mixed with minced fish meat, integrally molded and heated to prepare a fish paste product having a fibrous texture.

The applicant of the present invention filed an application for a patent titled "Fibrous Fish Paste Product and Process for Producing the Same" on May 26, 1977 [Japanese patent application No. 60441/1977 (Japanese patent Laid-Open No. 145954/1978)] and disclosed therein a novel fish paste product having a fibrous texture and a process for producing the same.

The feature of the invention of the previous application resides in that minced fish meat is finely cut in the shape of fibers before it is heated, that is, after it has been molded and allowed to gel, and the finely cut material is then heated to obtain a final product. To finely cut the material in the shape of fibers, the minced fish meat is extruded through a net made from, for example, a wire having a diameter of about 1 mm. The minced fish meat is in a gel state at this stage. Therefore, the minced fish meat which has been passed through the net so as to be finely cut does not break up but maintains its previous integral configuration. If this minced fish meat is heated a final product having the initial integral configuration is obtained. This final product minced fish meat comes apart into small pieces when eaten as it has been finely cut by the net when passing through the same, and this gives the sensation of eating the eye of a scallop or the leg meat of a crab.

In contrast to the aforementioned conventional method, the method according to the invention of the previous application does not involve the need to carry out the step of finely cutting the fish cake once produced by heating the minced fish meat in a gel state and recollecting the small pieces of the cut meat so as to mold them into a desired shape, and therefore enables a fish paste product having a fibrous texture to be prepared in a reduced number of steps.

Since the invention of the previous application was first accomplished, various types of food producing apparatus for putting it into practical use have been developed. However, there has heretofore been no apparatus capable of efficiently and properly extruding minced fish meat into a product having a fibrous texture.

A previously developed apparatus had an arrangement in which an amount of minced fish meat suitable for one fish paste product, which has been allowed to gel, is charged into a cylinder-like member, and a piston-like member is forced into the cylinder-like member from one open end thereof in such a manner that the minced fish meat is extruded through a net member stretched over the other open end of the cylinder-like member. This apparatus, however, involves the following problem. Since the minced fish meat possesses sticky consistency, when it is extruded by the piston-like member, the rearmost end portion of the material is attached to the net and does not separate from it. If, in this state, the piston-like member is returned, a vacuum is produced between the attached fish meat material and the piston-like member, thus causing the material to be drawn back into the cylinder-like member.

In order to solve this problem, an arrangement has been proposed in which a through-hole is provided in the piston-like member, so that, when the piston-like member is pulled back, the air is allowed to enter the area between the piston-like member and the attached minced fish meat. It has, however, been found that this through-hole may become clogged with the minced fish meat, and this arrangement is therefore unable to overcome the above-described problem.

To prevent the through-hole from being clogged with minced fish meat, another arrangement has been devised in which a check valve is provided at one end of the through-hole, and the through-hole is opened only when the piston-like member is pulled back. However, this arrangement has also been found to be unsatisfactory because the structure is undesirably complicated and, in addition, the check valve often suffers certain troubles due to the adhesion of the minced fish meat.

Problems similar to the above may arise also when soft foods (or soft food materials) are extruded to form products (or semi-finished products).

SUMMARY OF THE INVENTION

In view of the above-described circumstances, it is a primary object of the present invention to provide a food extruding apparatus which has a simplified structure and is capable of properly extruding a food product.

To this end, the present invention provides a food extruding apparatus comprising: a food receiving member having a through-hole for receiving a food or a food material which is to be extruded; an extruding means inserted into the through-hole from one end thereof and moved toward the other end, thereby extruding the food or food material received in the through-hole from the second end of the through-hole; and an actuating means for moving the extruding means from the first end of the through-hole toward the second end and also for returning the extruding means to its original position, the extruding means having an annular outer extruding member having an outer diameter slightly smaller than the inner diameter of the through-hole, and an inner extruding member disposed inside the outer extruding member, the actuating means being adapted to operate in such a manner that, when the inner and outer extruding members of the extruding means are returned from the second end of the through-hole to the first end, the outer extruding member is first returned at a relatively slow speed and then the inner extruding member is returned.

When this extruding apparatus is employed to manufacture a fish paste product having a fibrous texture such as that described above, a finely cutting net-like member made from a thin wire is set adjacent to one end of the above-described through-hole such that the extruded minced fish meat as a food material is passed through the finely cutting net-like member so as to be given a fibrous texture.

The above and other objects, features and advantages of the present invention will become clear from the following description of one embodiment thereof, taken in conjunction with the accompanying drawings.

DETAILED DESCRIPTION OF THE PREFERRED EMBODIMENT

Figure 1:
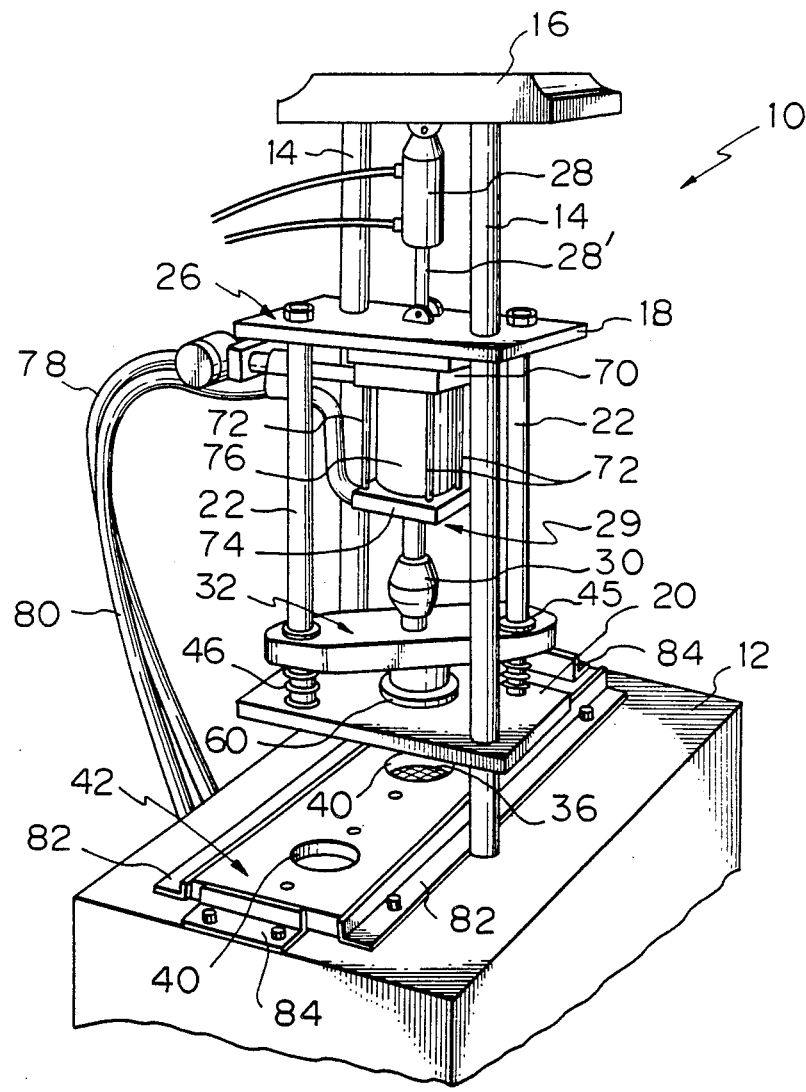
FIG. 1 is a perspective view of one embodiment of the food extruding apparatus according to the present invention.

FIG. 1 is a perspective view of a food extruding apparatus 10 in accordance with one embodiment of the present invention which may be employed for the manufacture of a fish paste product having a fibrous texture such as that described above, while FIG. 2 is a partially-sectioned side view of the apparatus 10 as viewed from the right-hand side thereof.

As illustrated, the apparatus 10 has a base 12, vertical supports 14 respectively secured at two diagonally opposing positions on the upper side of the base 12, and a top plate 16 secured to the respective tops of the supports 14. The apparatus 10 further has the following components. Namely, a slide structure 26 is composed of upper and lower plates 18, 20, and vertical connecting rods 22 which connect the upper and lower plates 18, 20. The slide structure 26 is mounted on the supports 14 such as to be slidable in the vertical direction. A drive means is constituted by a piston-cylinder device 28 mounted between the top plate 16 and the upper plate 18 of the slide structure 26. The drive means is adapted to move the slide structure 26 vertically along the supports 14 in response to the expansion and contraction of the piston rod 28' of the device 28. A pneumatic piston-cylinder device 29 is secured to the upper plate 18 of the slide structure 26. A minced fish meat extruding means 32 is brought into contact with the lower end of the piston rod 30 of the device 29 and is adapted to be pushed downward relative to the lower plate 20 and the connecting rods 22 of the slide structure 26 in response to the expansion of the rod 30. A means 38 for finely cutting minced fish meat has a through-hole 34 which is vertically aligned with the minced fish meat extruding means 32 and the piston-cylinder device 29. The means 38 further has a finely cutting member 36 defined by the wire stretched in the shape of a net over the upper end opening of the through-hole 34. In addition, a minced fish meat receiving member 42 has a through-hole 40 which has the same diameter as that of the through-hole 34 of the means 38 and which is vertically aligned with the through-hole 34 and adapted to receive minced fish meat S and shape it into a predetermined configuration (a disk shape in the illustrated example).

The minced fish meat extruding means 32 has a push-down plate 44 which is slidably mounted on the connecting rods 22 of the slide structure 26. Annular plates 45 are secured to the upper side of the push-down plate 44 in such a manner that the plates 45 respectively surround the connecting rods 22 of the slide structure 26. Compression springs 46 are provided between the annular plates 45 and the lower plate 20 of the slide structure 26 in such a manner that the springs 46 respectively surround the connecting rods 22. In addition, a projection 48 which is aligned with the piston rod 30 is provided at the center of the upper side of the push-down plate 44. The convexly curved upper end surface of the projection 48 is brought into contact with the flat lower end surface of the piston rod 30 by means of the force applied thereto by the compression springs 46. A tubular outer extruding member 50 which is aligned with the through-hole 40 of the minced fish meat receiving member 42 is secured to the lower side of the push-down plate 44. A columnar inner extruding member 52 which is concentric with the outer extruding member 50 is slidably provided within the bore in the member 50.

The outer extruding member 50 is adapted to be slidable within a vertical bore in a tubular guide member 60 which is secured to the center of the lower plate 20 of the slide structure 26. The outer extruding member 50 has an outer diameter slightly smaller than the diameter of the through-hole 40 provided in the minced fish meat receiving member 42.

Figure 3:
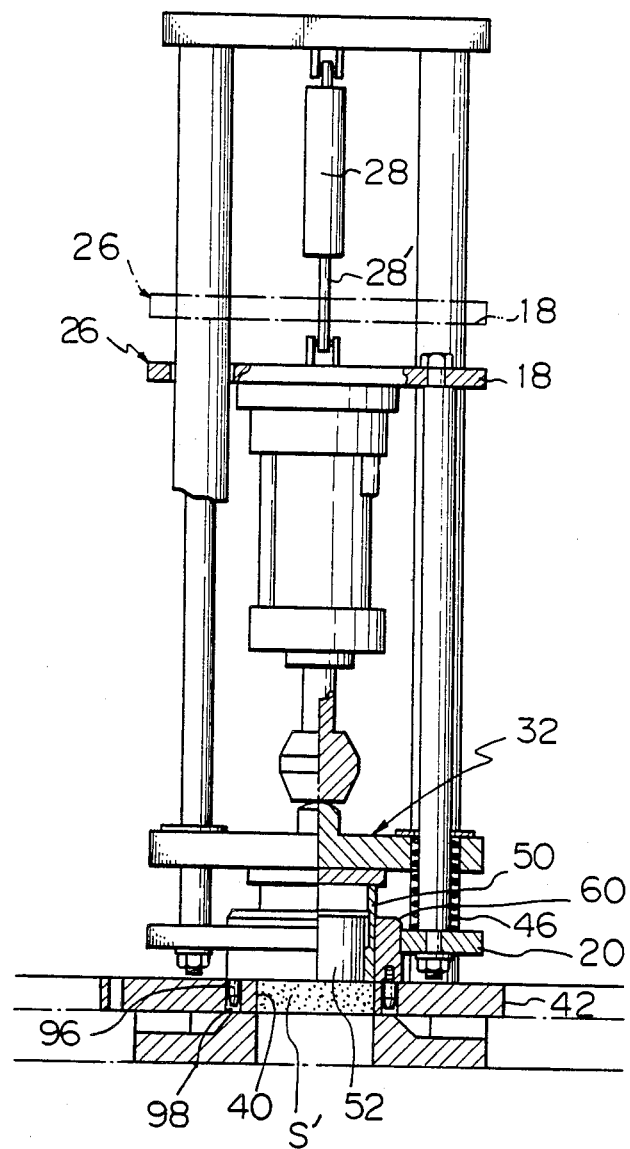
Figure 4:
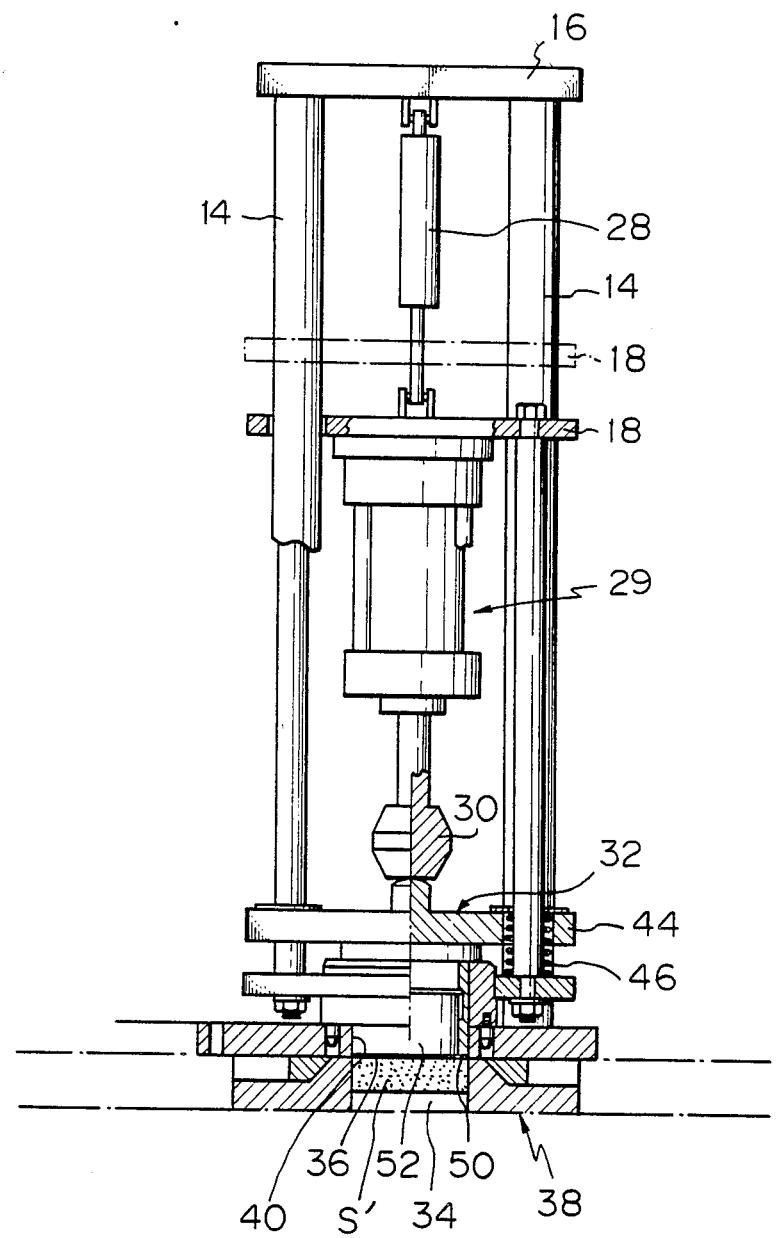

The inner extruding member 52 has an annular flange 54 at the upper end edge thereof. The flange 54 is adapted to be positioned inside a larger-diameter portion 56 provided in the bore of the outer extruding member 50. More specifically, unless it is subjected to a push-up force applied from the lower side thereof, the inner extruding member 52 is placed by virtue of its own weight at a position (shown in FIG. 2) at which the flange 54 is engaged with a step portion which defines the lower end edge of the larger-diameter portion 56, whereas, when a push-up force is applied to the member 52, it is able to rise to a position at which the flange 54 is engaged with a step portion which defines the upper end edge of the larger-diameter portion 56. FIGS. 3 and 4 show the inner extruding member 52 in a raised state. In this state, the respective lower end faces of the inner and outer extruding members 52, 50 coincide with each other, thereby defining a minced fish meat extruding surface employed during the minced fish meat extruding operation, explained below.

The piston-cylinder device 29 has a cage-like member consisting of an upper member 70 secured to the lower side of the upper plate 18 of the slide structure 26 and a lower member 74 connected to the upper member 70 through connecting rods 72. A cylinder 76 is secured inside this cage-like member. A chamber which is defined above a piston (not shown) inside the cylinder 76 is communicable with a high-pressure air source (not shown) through a tube 78. The lower chamber in the cylinder 76 is communicated with the atmosphere through a tube 80.

The minced fish meat receiving member 42 in the illustrated embodiment is constituted by a rectangular plate material which is provided with two through-holes 40 disposed symmetrically on either side of a line drawn laterally through the center of the plate. The receiving member 42 is adapted to be slidable on the base 12 in the longitudinal direction of the member 42 along guide members 82 secured to the upper side of the base 12 at a predetermined spacing. The slide movement of the receiving member 42 is limited by stopper members 84 which are secured to the upper side of the base 12 in such a manner that the members 84 are spaced apart from each other in the longitudinal direction of the member 42. When the receiving member 42 abuts against one of the stopper members 84 (the left-hand stopper member 84 in the example shown in FIG. 2) such as to be retained thereby, one of the through-holes 40 (the right-hand through-hole 40 in the example shown in FIG. 2) of the receiving member 42 is aligned with the through-hole 34 provided in the minced fish meat finely cutting means 38. When the receiving member 42 is moved on the base 12 and retained by the other stopper member 84, the other through-hole 40 of the member 42 is aligned with the through-hole 34 of the minced fish meat finely cutting means 38. It should be noted that the length of each of the through-holes 40 is preferably set such as to be smaller than double the height of the minced fish meat S which is extruded in a single extruding operation, as will be understood from the explanation of the operation below.

The minced fish meat finely cutting means 38 has a finely cutting net-like member 36 and two annular members 88, 90 for supporting the member 36. The first annular member 90 has the above stated through-hole 34 in the center thereof. The upper side of the member 90 has two flat surfaces which are connected by a conical surface 92. The second annular member 88 has a conical bore wall surface and this conical wall surface is in close contact with the conical surface 92 of the first annular member 90. The finely cutting member 36 is set on the upper side of the first annular member 90 in such a manner as to cover the upper end opening of the through-hole 34. The peripheral edge portion of the member 36 is clamped between the first and second annular members 90, 88. The second annular member 88 is fastened to the first annular member 90 by means of a fastening member (not shown).

The following is a description of the operation of the food extruding apparatus 10 in accordance with this embodiment.

The piston-cylinder device 28 is first set in a state wherein the piston rod 28' is withdrawn thereinto so that the slide structure 26 is placed at a maximumly raised position. The piston-cylinder device 29, which is secured to the slide structure 16, is set in a position where the piston rod 30 is withdrawn thereinto. In consequence, the apparatus 10 is brought into an extrusion stand-by state such as that shown in FIGS. 1 and 2.

Then, the piston rod 28' of the piston-cylinder device 28 is expanded to push down the slide structure 26, thus causing the lower end surface of the tubular guide member 60, which is secured to the lower plate 20 of the slide structure 26, to abut against the upper surface of the receiving member 42, as shown in FIG. 3. At this time, a pair of centering projections 96 which are provided on the lower end surface of the guide member 60 respectively enter a pair of centering bores 98 which are provided on both sides of each of the through-holes 40 provided in the minced fish meat receiving member 42, whereby centering of the through-holes 34 and 40 is effected. In this state, the inner extruding member 52 of the minced fish meat extruding means 32, which was projected downward from the outer extruding member 50 by its own weight in the stand-by state shown in FIGS. 1 and 2, is engaged with the upper surface of the raw minced fish meat S charged in the through-hole 40 of the minced fish meat receiving member 42 and thereby pushed upwardly, so that the respective lower end surfaces of the inner and outer extruding members 52, 50 define one flat plane and engage with the minced fish meat S.

Then, pressurized air is rapidly supplied to the piston-cylinder device 29 secured to the slide structure 26 so as to rapidly expand the piston rod 30, thereby pushing down the minced fish meat extruding means 32 and thus pushing down the lower end surface of the extruding member constituted by the outer and inner extruding members 50, 52 to a position in close proximity with the finely cutting net-like member 36. This state is shown in FIG. 4. Thus, the minced fish meat S which was charged into the through-hole 40 of the receiving member 42 has been extruded from the through-hole 40 through the finely cutting member 36 and pushed into the through-hole 34 of the finely cutting means 38 by the action of the extruding means 32, the minced fish meat S remaining in the through-hole 34.

Thereafter, the high-pressure air which has been supplied to the piston-cylinder device 29 is let out of it at slow speed, whereby the piston rod 30 is slowly withdrawn. In consequence, the push-down plate 44 of the minced fish meat extruding means 32 is slowly raised by the action of the compression springs 46, so that the outer extruding member 50 of the means 32 is raised relative to the inner extruding member 52 which is left as it is. As a result, an annular space is produced between the inner extruding member 52, the bore wall of the tubular guide member 60, the upper end surface of the minced fish meat S' and the outer extruding member 50. However, since the outer extruding member 50 is raised slowly, air enters the space through a gap around it, and there is therefore no fear of any vacuum being produced.

Figure 2:
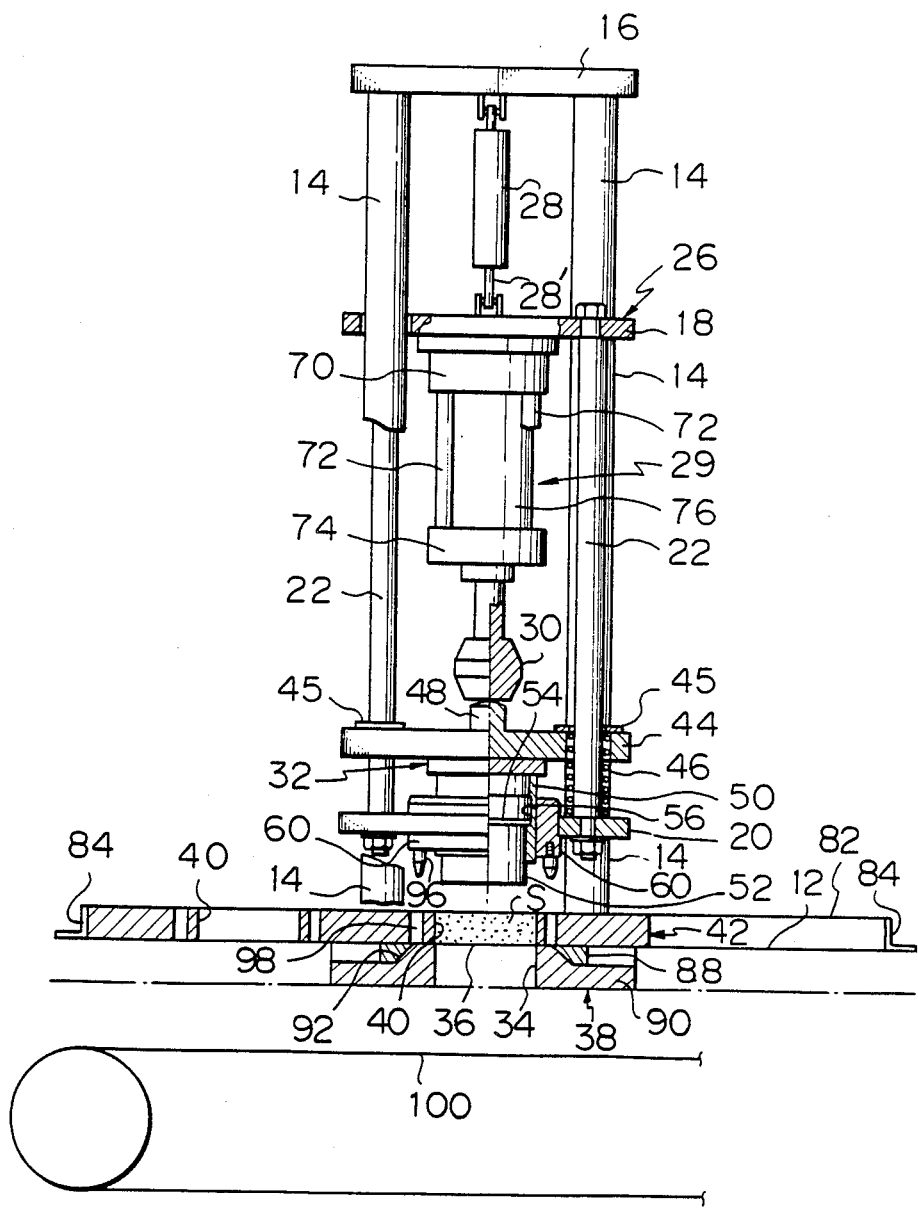
FIGS. 2 to 4 are partially-sectioned side views of the apparatus shown in FIG. 1 as viewed from the right-hand side thereof, which respectively illustrate sequential operation steps.

Then, the piston rod 28' of the piston-cylinder device 28 is withdrawn so as to raise the slide structure 26 to the previous position shown in FIGS. 1 and 2. In consequence, the extruding means 32 is also raised, so that the inner extruding member 52 which was left in the through-hole 40 of the receiving member 42 is drawn out of it and brought into a state such as that shown in FIGS. 1 and 2. When the inner extruding member 52 is raised, air enters the space between the member 52 and the upper end surface of the minced fish meat S' through a peripheral gap, and there is therefore no fear of any vacuum being produced.

After the above-described step, the receiving member 42 is longitudinally moved on the base 42, and the other through-hole 40 charged with another minced fish meat is thereby aligned with the through-hole 34 of the minced fish meat finely cutting means 38.

Then, the piston-cylinder devices 28, 29 are sequentially actuated to effect extrusion of the second raw minced fish meat. This newly extruded minced fish meat pushes downward the minced fish meat S' which has previously been extruded. Accordingly, the pushed minced fish meat S' is dropped from the through-hole 34 of the finely cutting means 38 onto a conveyor 100 provided under the through-hole 34.

By repeating the above-described steps, extrusion of minced fish meat having a fibrous texture is automatically carried out.

Although the present invention has been described by way of one embodiment in which the invention is applied to a food extruding apparatus employed to manufacture a fish paste product having a fibrous texture, the food extruding apparatus according to the present invention is not necessarily limited thereto. The apparatus of the present invention has a basic arrangement such as that described above, and the feature of the apparatus resides in that the extruding means is constituted by the outer and inner extruding members 50, 52 and that, after an extruding operation, these extruding members are not pulled back simultaneously, the outer extruding member 50 being first pulled back slowly and the inner extruding member 52 then being raised. There is therefore no fear of any vacuum being produced between the upper surface of a portion of food or food material and the extruding member when pulled back. Accordingly, it is possible to effect an extruding operation smoothly and properly.

What is claimed is:

1. A food extruding apparatus comprising:

a food receiving member having a through-hole for receiving a food or a food material which is to be extruded;

an extruding means inserted into said through-hole from one end thereof and moved toward a second end, thereby extruding the food or food material received in said through-hole from said second end of said through-hole; and an actuating means for moving said extruding means from said first end of said through-hole toward said second end and also for returning said extruding means to its original position;

said extruding means having an annular outer extruding member having an outer diameter slightly smaller than the inner diameter of said through-hole, and an inner extruding member disposed inside said outer extruding member; and said actuating means being adapted to operate in such a manner that, when the inner and outer extruding members of said extruding means are returned from said second end of said through-hole to said first end, said outer extruding member is first returned at a relatively slow speed, and then said inner extruding member is returned.

2. A food extruding apparatus according to claim 1, wherein the inner and outer extruding members of said extruding means are set above said through-hole in such a manner that they are vertically aligned with said through-hole, said inner extruding member being set such that, when no push-up force is applied to said inner extruding member, it is placed by virtue of its own weight at a position where the lower end surface thereof is below the lower end surface of said outer extruding member, whereas, when a push-up force is applied to said inner extruding member, it is pushed up to a position where the lower end surface thereof is virtually flush with the lower end surface of said outer extruding member, said actuating means being adapted to apply the force for moving said extruding means to said outer extruding member.

3. A food extruding apparatus according to claim 2, wherein said extruding means is supported by a slide structure which is vertically movably mounted in said apparatus such that said extruding means is vertically movable relative to said slide structure, said actuating means being constituted by a first piston-cylinder device secured to said slide structure and having a piston rod which is in contact with the upper side of said extruding means so as to push it downwardly, a spring for biasing said extruding means upwardly so that said extruding means is pressed against said piston rod, and a second piston-cylinder device for vertically moving said slide structure.

4. A food extruding apparatus according to claim 1 further including means for finely cutting the food or food material which is extruded from said through-hole, said cutting means having a through-hole which is adapted to be aligned with said through-hole of said food receiving member and a net-like cutting member provided over one end of the through-hole of the cutting means, said one end being positioned adjacent to said second end of the through-hole of said food receiving member when the through-hole of the cutting means is aligned with the through-hole of the food receiving member.

5. A food extruding apparatus according to claim 4, wherein the length of the through-hole of the food receiving member is set such as to be smaller than double the height of the food or food material extruded from said through-hole of said food receiving member.

* * * * *